UNITED STATES PATENT OFFICE.

ARTHUR LÜTTRINGHAUS, OF MANNHEIM, AND WILHELM BRAREN, OF LUDWIGS-HAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

ANTHRAQUINONE ACRIDONES.

1,067,046.  Specification of Letters Patent.  Patented July 8, 1913.

No Drawing.  Application filed September 21, 1911.  Serial No. 650,645.

*To all whom it may concern:*

Be it known that we, ARTHUR LÜTTRINGHAUS and WILHELM BRAREN, subjects, respectively, of the King of Prussia, residing, respectively, at Mannheim and Ludwigshafen-on-the-Rhine, Germany, have invented new and useful Improvements in Anthraquinone Acridones, of which the following is a specification.

Our invention relates to the production of coloring matters of the anthraquinone series possessing a constitution corresponding to

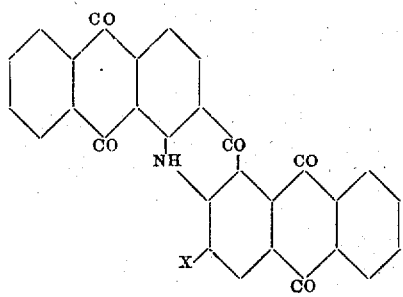

where X is equal to chlorin or methyl.

We prepare our new coloring matters by reacting with 1-chlor-anthraquinone-2-carboxylic acid on 3-amino-4-methyl-diphenyl-ketone-12'-carboxylic acid, or on 3-amino-4-chlor-diphenyl-ketone-2'-carboxylic acid, and treating the product with a condensation agent in such a manner that an acridone ring is formed and also the second carboxylic acid group enters into reaction, so that a second anthraquinone complex is formed. The production of our new coloring matter from 3-amino-4-methyl-diphenyl-ketone-2'-carboxylic acid and 1-chlor-anthraquinone-2-carboxylic acid takes place in steps in the manner illustrated by the following formulæ—

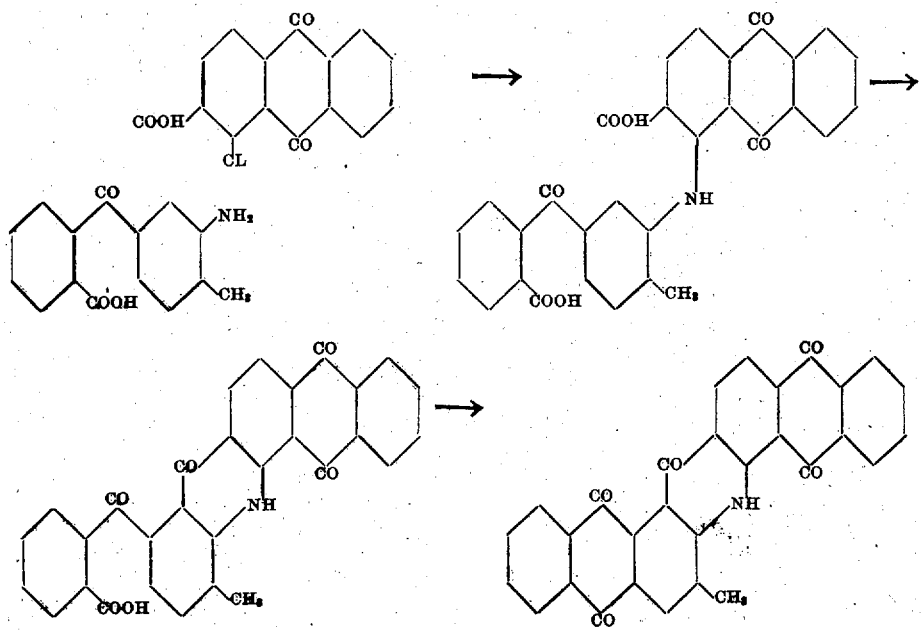

Analogous formulæ represent the production of the chlorinated coloring matter.

Our new coloring matters consist, when dry, of from reddish brown to yellow-brown powders which are difficultly soluble in the ordinary organic solvents. They yield deep violet vats with alkaline hydrosulfite solution and dye cotton from reddish orange to yellowish orange shades of excellent fastness.

The following example will serve to illustrate further the nature of our invention and how it can be carried into practical effect, but the invention is not confined to this example. The parts are by weight. Boil together for seven hours, in a reflux apparatus, seventy-six and a half parts of 3-amino-4-methyl-diphenyl-ketone-2'-carboxylic acid, eighty-six parts of 1-chlor-anthraquinone-2-carboxylic acid, three parts of copper powder, one hundred and fifty parts of calcined sodium carbonate, thirty-six parts of sodium bicarbonate, and seven hundred and fifty parts of water. Then dilute the mixture with hot water, filter, and acidify with acetic acid, whereupon the condensation product represented by the formula

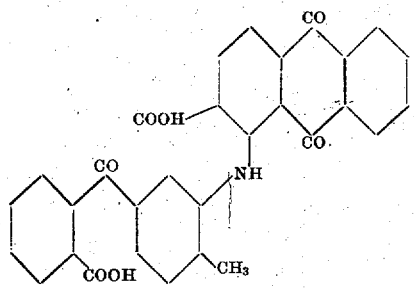

is precipitated and can be purified by extracting it with boiling dilute hydrochloric acid. It is a violet powder which yields a red-violet solution in alkali and, on the addition of hydrosulfite solution, turns light brown-red. It yields a brownish yellow solution in concentrated sulfuric acid. Then heat together, for four hours, on the water-bath, ten parts of this product and one hundred parts of concentrated sulfuric acid, and pour the reaction product into water, whereupon a compound corresponding to the formula

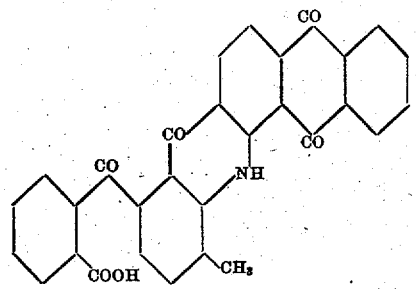

is obtained. This yields a red-violet solution in alkali and, on the addition of hydrosulfite, gives the characteristic deep violet color of the anthraquinone-acridones. The formation of the second anthraquinone residue can be caused by heating the product with sulfuric acid at about one hundred and seventy degrees centigrade until a test portion is no longer soluble in alkalis. The reaction product can be isolated by pouring the mixture into water and is, when dry, a reddish brown powder which is very difficultly soluble in most organic solvents. It yields, with alkaline hydrosulfite, a deep violet vat and colors cotton brownish shades which, upon oxidation in the air or, more quickly, by treatment with suitable oxidizing agents, become brilliant red-orange shades of excellent fastness. In a similar manner coloring matter can be obtained from 1-chlor-anthraquinone-2-carboxylic acid and 3-amino-4-chlor-diphenyl-ketone-2'-carboxylic acid, this coloring matter containing chlorin as a substituent instead of methyl in the ortho position to the imino group of the acridin ring; and the chlorin and methyl are equivalent substituents for this purpose.

Now what we claim is:—

1. As new articles of manufacture the coloring matters being acridones of the anthraquinone series possessing a constitution corresponding to the formula

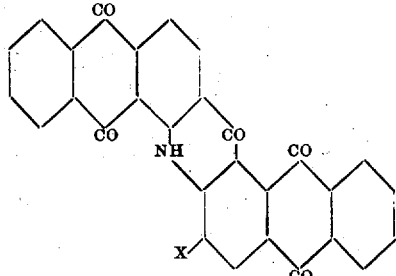

in which X denotes a substituent in the ortho position to the imino group of the acridin ring, which coloring matters consist, when dry, of from reddish brown to yellow-brown powders which are difficultly soluble in the ordinary organic solvents, and which yield deep violet shades with alkaline hydrosulfite solution and dye cotton from reddish orange to yellowish orange shades of excellent fastness.

2. As a new article of manufacture the coloring matter being an acridone of the anthraquinone series and possessing a constitution corresponding to the formula

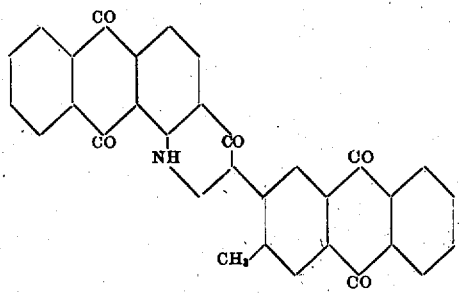

which coloring matter consists, when dry, of a reddish brown powder which is difficultly soluble in the ordinary organic solvents, and which yields a deep violet shade with alkaline hydrosulfite solution and dyes cotton from a vat reddish orange shades of excellent fastness.

In testimony whereof we have hereunto set our hands in the presence of two subscribing witnesses.

ARTHUR LÜTTRINGHAUS.
WILHELM BRAREN.

Witnesses:
J. ALEC. LLOYD,
JOSEPH PFEIFFER.

---

It is hereby certified that in Letters Patent No. 1,067,046, granted July 8, 1913, upon the application of Arthur Lüttringhaus, of Mannheim, and Wilhelm Braren, of Ludwigshafen-on-the-Rhine, Germany, for an improvement in "Anthraquinone Acridones," errors appear in the printed specification requiring correction as follows: Page 1, line 17, for the numeral "12'" read 2'; page 2, line 67, for the word "acridin" read *acridone;* and page 3, second column, formula, for

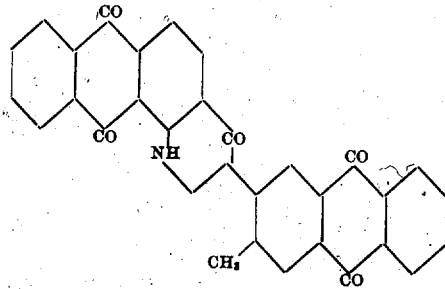 read 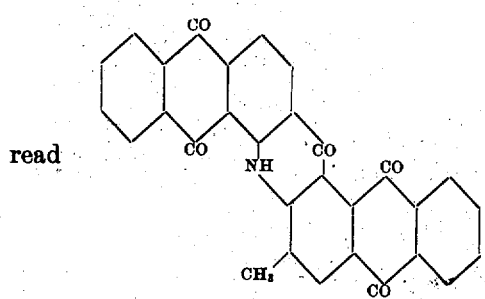

and that the said Letters Patent should be read with these corrections therein that the same may conform to the record of the case in the Patent Office.

Signed and sealed this 30th day of September, A. D., 1913.

[SEAL.]

R. T. FRAZIER,
*Acting Commissioner of Patents.* coloring matters being acridones of the anthraquinone series possessing a constitution corresponding to the formula

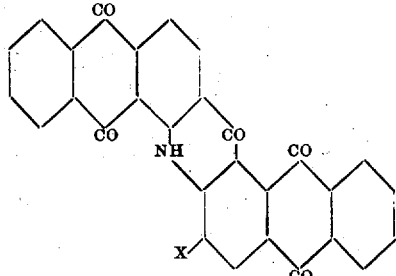

in which X denotes a substituent in the ortho position to the imino group of the acridin ring, which coloring matters consist, when dry, of from reddish brown to yellow-brown powders which are difficultly soluble in the ordinary organic solvents, and which yield deep violet shades with alkaline hydrosulfite solution and dye cotton from reddish orange to yellowish orange shades of excellent fastness.

2. As a new article of manufacture the coloring matter being an acridone of the anthraquinone series and possessing a constitution corresponding to the formula which coloring matter consists, when dry, of a reddish brown powder which is difficultly soluble in the ordinary organic solvents, and which yields a deep violet shade with alkaline hydrosulfite solution and dyes cotton from a vat reddish orange shades of excellent fastness.

In testimony whereof we have hereunto set our hands in the presence of two subscribing witnesses.

ARTHUR LÜTTRINGHAUS.
WILHELM BRAREN.

Witnesses:
J. ALEC. LLOYD,
JOSEPH PFEIFFER.

---

Corrections in Letters Patent No. 1,067,046.

It is hereby certified that in Letters Patent No. 1,067,046, granted July 8, 1913, upon the application of Arthur Lüttringhaus, of Mannheim, and Wilhelm Braren, of Ludwigshafen-on-the-Rhine, Germany, for an improvement in "Anthraquinone Acridones," errors appear in the printed specification requiring correction as follows: Page 1, line 17, for the numeral "12'" read *2'*; page 2, line 67, for the word "acridin" read *acridone;* and page 3, second column, formula, for

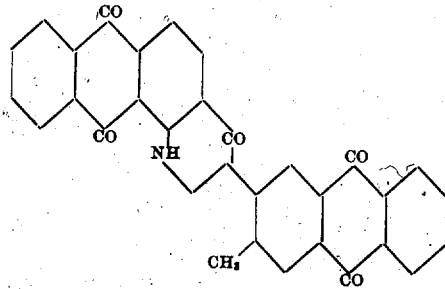 read 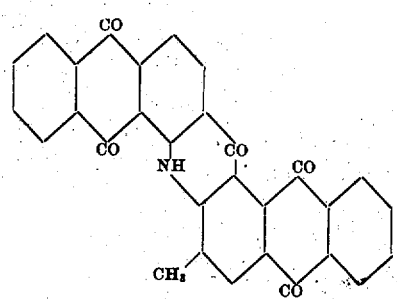

and that the said Letters Patent should be read with these corrections therein that the same may conform to the record of the case in the Patent Office.

Signed and sealed this 30th day of September, A. D., 1913.

[SEAL.]

R. T. FRAZIER,
*Acting Commissioner of Patents.*

It is hereby certified that in Letters Patent No. 1,067,046, granted July 8, 1913, upon the application of Arthur Lüttringhaus, of Mannheim, and Wilhelm Braren, of Ludwigshafen-on-the-Rhine, Germany, for an improvement in "Anthraquinone Acridones," errors appear in the printed specification requiring correction as follows: Page 1, line 17, for the numeral "12'" read *2'*; page 2, line 67, for the word "acridin" read *acridone;* and page 3, second column, formula, for

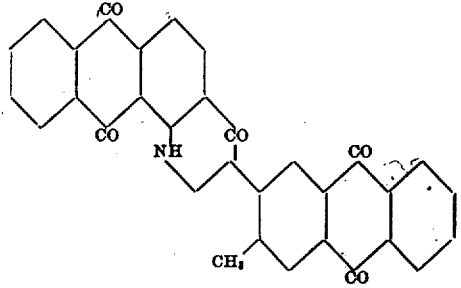  read  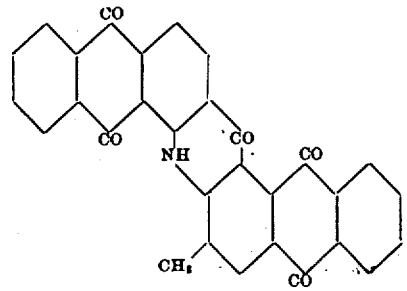

and that the said Letters Patent should be read with these corrections therein that the same may conform to the record of the case in the Patent Office.

Signed and sealed this 30th day of September, A. D., 1913.

[SEAL.]

R. T. FRAZIER,
*Acting Commissioner of Patents.*